J. F. CRAVEN.
GREASE CUP.
APPLICATION FILED FEB. 5, 1910.
979,826.
Patented Dec. 27, 1910.
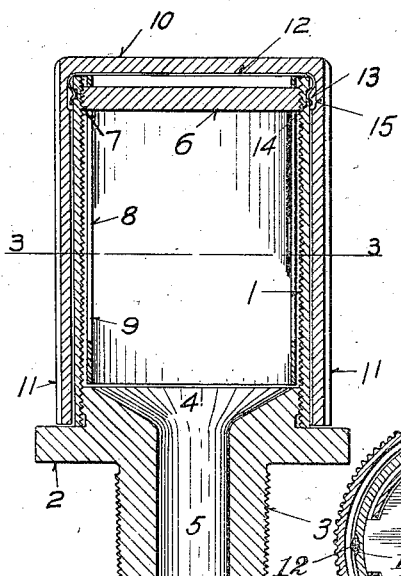
Fig. 1.
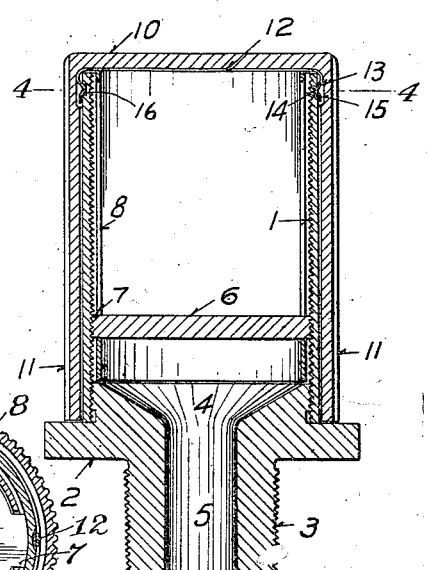
Fig. 2.
Fig. 4.
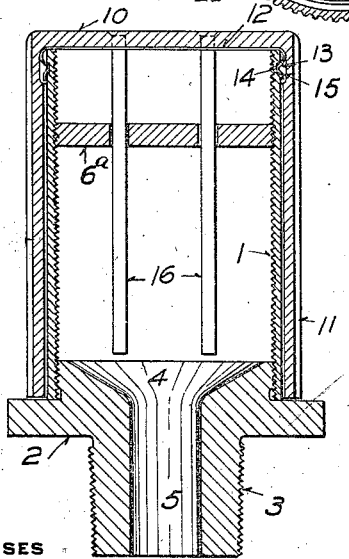
Fig. 5.
Fig. 3.
WITNESSES
Stephen Wach.
INVENTOR
James F. Craven,
By Fred'k W. Winter
Attorney

UNITED STATES PATENT OFFICE.

JAMES F. CRAVEN, OF PITTSBURG, PENNSYLVANIA, ASSIGNOR TO CRAVEN ENGINEERING COMPANY, OF PITTSBURG, PENNSYLVANIA, A CORPORATION OF PENNSYLVANIA.

GREASE-CUP.

979,826.

Specification of Letters Patent. Patented Dec. 27, 1910.

Application filed February 5, 1910. Serial No. 542,289.

*To all whom it may concern:*

Be it known that I, JAMES F. CRAVEN, a resident of Pittsburg, in the county of Allegheny and State of Pennsylvania, have invented a new and useful Improvement in Grease-Cups, of which the following is a specification.

The invention relates to what are known as grease or oil cups for attachment to bearings of various forms of machinery to supply grease or other lubricating substance thereto.

The invention relates primarily to a cup for supplying fairly thick lubricants to the bearings, preferably grease, although it may also be used for supplying thinner lubricants or oils. For brevity, it will be referred to as a grease cup, but it will be understood that it is not intended thereby to limit its use to lubricants which are ordinarily spoken of as grease.

The object of the invention is to provide a grease cup by means of which the lubricant can be positively fed to the bearing in the desired amount or at the desired rate of speed, which is so constructed that it will protect the lubricant and bearing against dirt and grit, and which occupies a minimum amount of space and presents no objectionable projections or obstructions.

The invention comprises the construction and arrangement of parts hereinafter described and claimed.

In the accompanying drawing, Figure 1 is a vertical section through my improved grease cup showing the same when the cup is practically full of grease; Fig. 2 is a similar view showing the parts in the position they assume when the cup is nearly empty; Fig. 3 is a horizontal section on the line 3—3, Fig. 1; Fig. 4 is a similar section on the line 4—4, Fig. 2; and Fig. 5 is a view similar to Fig. 1 showing a modification.

The cup comprises a suitable casing 1, which is shown as formed from a short piece of tubing, and is threaded internally. The lower end thereof is closed by means of a bottom piece 2, which is threaded into the lower end of the casing, and is provided with a downward projection or nipple 3, which is threaded externally for connection to the machine bearing, as is the usual practice. The bottom piece is provided with a dished or conical top face 4, and is provided with the feeding opening 5 through which the lubricant passes to the bearing.

The lubricant is placed in the cup or casing 1, and is forced out of the same through the opening 5 by means of a piston or plunger 6. This may be forced downwardly in various ways, and as shown, is provided with projections 7, which, on their outer or peripheral faces are threaded to engage the internal threads of the casing 1, so that the rotation of the piston causes it to travel up and down, depending upon the direction in which it is rotated. Various means can be provided for rotating this piston and causing it to travel up and down. As shown in Figs. 1 to 4, there is provided a tube 8, which projects down into the casing and is provided with vertical slots 9, through which the threaded projections 7 of the piston extend. Tube 8 is secured to a suitable top or cap 10, provided with a downwardly extending sleeve or apron 11, which projects over the casing 1 and assists in preventing dust working up into the cup, and which is externally fluted or knurled so it may be readily grasped in order to turn the same. It is obvious that the rotation of the cap 10 carries with it the tube 8 and piston 6, and since the latter has a threaded connection with the casing 1, said piston is caused to travel up or down, such upward and downward movement being permitted by the vertical slots 9 in the tube 8.

To hold the cap 10 in place, I provide a spring 12, lying inside of the cap and projecting through walls in the tube 8 and provided with projections 13, forming spring catches adapted to engage an annular groove 14 in the outer face of the casing 1 near its upper end. These spring catches lie in recesses 15 in the inner face of cap 10 and are thereby prevented from coming out of the cap. They prevent the cap from lifting under ordinary circumstances, but do not prevent the same from being pulled or lifted off by the piston when the cap is turned to raise the piston sufficiently far to press against the upper end of the slots 9 in the tube 8 which is secured to the cap. This is necessary in order to permit a fresh supply of lubricant to be placed in the cup.

In use, the cup is screwed into the bearing as is usual. The cap is removed and the lubricant, preferably a grease, placed inside of the tube 8, and the latter then inserted into the casing 1. The cap is then rotated causing the threaded projections 7 on piston 6 to engage the internal threads in the casing. The downward movement of the piston caused by the rotation of the cap 10, forces the lubricant out of the cup and into the bearing. The cap will be rotated from time to time, as may be necessary to supply the required amount of lubricant to the bearing. When the cup is empty, or practically so, the cap 10 is rotated in the reverse direction until the piston is entirely freed from the threads in the casing, said piston at its extreme outer movement bearing against the cap and lifting the latter off the casing. The cup can then be filled with a fresh supply of lubricant.

Fig. 5 illustrates a modification in which in lieu of the slotted tube 8 for rotating the piston 6, a pair of rods 16 are employed, said rods being carried by the cap 10 and projecting loosely through holes in the piston 6ª, so that the latter is free to slide on said rods while being rotated thereby. In this case the piston can be threaded around its entire periphery.

One or more depressions 16 are preferably provided in the bottom of groove 14, into which the projections 13 of spring 12 can drop and retard the free rotation of the cap 10. The depression or depressions can be so placed as to stop the rotation of cap 10 at each full, half, or other fraction of rotation of the cap. This insures the rotation of the cap through different degrees and insures a uniform supply of lubricant to the bearing.

By means of the cup described a proper supply of lubricant is insured, as the same is positively fed into the bearing. The cup is so well closed that dust and grit cannot work into the same. By reason of the vertical movement of piston 6, relatively to its rotating means, to wit, the tube 8, objectionable projections or height is prevented. In fact, the cap 10, or equivalent rotating means, is at exactly the same elevation when the cup is full as when it is empty, which is not the case with the usual grease cups in which screws or the like are used to force the grease into the bearing, which screws project upwardly to an objectionable extent when the cup is full.

What I claim is:

1. A grease cup comprising a casing inclosing a chamber to receive the grease and provided in its bottom with an opening for the discharge of the grease, a plunger vertically movable in said chamber to expel the grease, a rotatable closure for said casing, and means connected to said closure and surrounding the body of grease and arranged to actuate said plunger, said plunger and actuating means being provided with inter-engaging sliding connections.

2. A grease cup comprising a casing inclosing a chamber to receive the grease and provided in its bottom with an opening for the discharge of the grease, a rotary plunger vertically movable in said chamber to expel the grease, and means arranged to rotate said plunger without opening the casing, said plunger and rotating means being provided with inter-engaging connections permitting movement of the plunger vertically relatively to the rotating means.

3. A grease cup comprising a casing inclosing a chamber to receive the grease and provided in its bottom with a grease discharge opening, a rotatable plunger in said casing and having threaded connection therewith, a rotatable closure for said casing, and means actuated by said rotatable closure and arranged to rotate said plunger, said plunger and rotating means being provided with inter-engaging sliding connections.

4. A grease cup comprising a casing inclosing a chamber and provided in its bottom with a grease discharge opening and being internally threaded, a cap, a tube carried thereby and projecting down into the casing and provided with vertical slots, a plunger provided with projections extending through said slots and threaded externally to engage the internal threads of the casing.

5. A grease cup comprising a casing inclosing a chamber and provided in its bottom with a grease discharge opening and being internally threaded, a plunger having a threaded connection with said casing, a rotatable cap closing said casing, means projecting from said cap and engaging the plunger and allowing independent vertical movement of the plunger, and means connecting the cap and casing for preventing accidental separation thereof.

6. A grease cup comprising a casing inclosing a chamber to receive the grease and provided in its bottom with a grease discharge opening and being internally threaded, a plunger in said casing and externally threaded to engage the internal threads on the casing, a cap closing said casing, a spring carried by said cap and engaging an annular groove in the casing, and a member projecting from the cap and engaging the plunger to rotate the latter and permit independent vertical movement thereof.

In testimony whereof, I have hereunto set my hand.

JAMES F. CRAVEN.

Witnesses:
F. W. WINTER,
JAS. L. WELDON.